United States Patent [19]

Kobayashi et al.

[11] Patent Number: 5,103,694
[45] Date of Patent: Apr. 14, 1992

[54] LINE PRESSURE CONTROL ARRANGEMENT FOR AUTOMOTIVE AUTOMATIC TRANSMISSION

[75] Inventors: Masayuki Kobayashi; Takashi Shibayama, both of Isehara; Shigeru Ishii, Atsugi, all of Japan

[73] Assignee: Nissan Motor Co., Ltd., Yokohama, Japan

[21] Appl. No.: 485,030

[22] Filed: Feb. 26, 1990

[51] Int. Cl.⁵ .............................................. F16H 61/06
[52] U.S. Cl. .................................. 74/867; 364/424.1; 74/869
[58] Field of Search ..................... 74/867, 866, 869; 364/424.1

[56] References Cited

U.S. PATENT DOCUMENTS

| | | | |
|---|---|---|---|
| 4,283,970 | 8/1981 | Vukovich | 74/866 |
| 4,502,354 | 3/1985 | Suzuki et al. | 74/866 |
| 4,527,678 | 7/1985 | Pierce et al. | 74/866 |
| 4,665,777 | 5/1987 | Kikuchi et al. | 74/866 |
| 4,706,552 | 11/1987 | Nitz | 74/866 |
| 4,707,789 | 11/1987 | Downs et al. | 74/866 X |
| 4,730,521 | 3/1988 | Hayasaki et al. | 74/867 |
| 4,793,216 | 12/1988 | Hiratmatsu | 74/866 |
| 4,796,490 | 6/1989 | Butts et al. | 74/866 |
| 4,845,618 | 7/1989 | Narita | 364/424.1 |
| 4,858,499 | 8/1989 | Ito et al. | 74/866 |
| 4,868,758 | 9/1989 | Mori | 364/424.1 |
| 4,903,550 | 2/1990 | Kuwayama et al. | 74/867 X |
| 4,953,090 | 8/1990 | Narita | 74/866 |
| 4,955,259 | 9/1990 | Narita | 74/867 X |
| 4,981,053 | 1/1991 | Yamaguchi | 74/866 |
| 4,982,621 | 1/1991 | Sano | 74/866 |
| 4,998,451 | 3/1991 | Sano | 74/866 X |

FOREIGN PATENT DOCUMENTS 60-231059 11/1985 Japan.
62-88856 4/1987 Japan.

Primary Examiner—Leslie A. Braun
Assistant Examiner—Khoi Q. Ta
Attorney, Agent, or Firm—Foley & Lardner

[57] ABSTRACT

When a shift command is issued the line pressure is dropped to a first low level until such time as the inertia phase of the shift begins. From this time the level of line pressure is raised and maintained at a second higher level until the end of the inertia phase. During the final stage of the shift, the level of line pressure is again lowered. A spike in the transmission torque output when tends to occur at the beginning of the inertia phase is attenuated, the level of torque which is transmitted during the inertia phase is elevated and spikes which tend to be produced by the final engagement are reduced by the temporarily lowered final stage line pressure level.

5 Claims, 10 Drawing Sheets

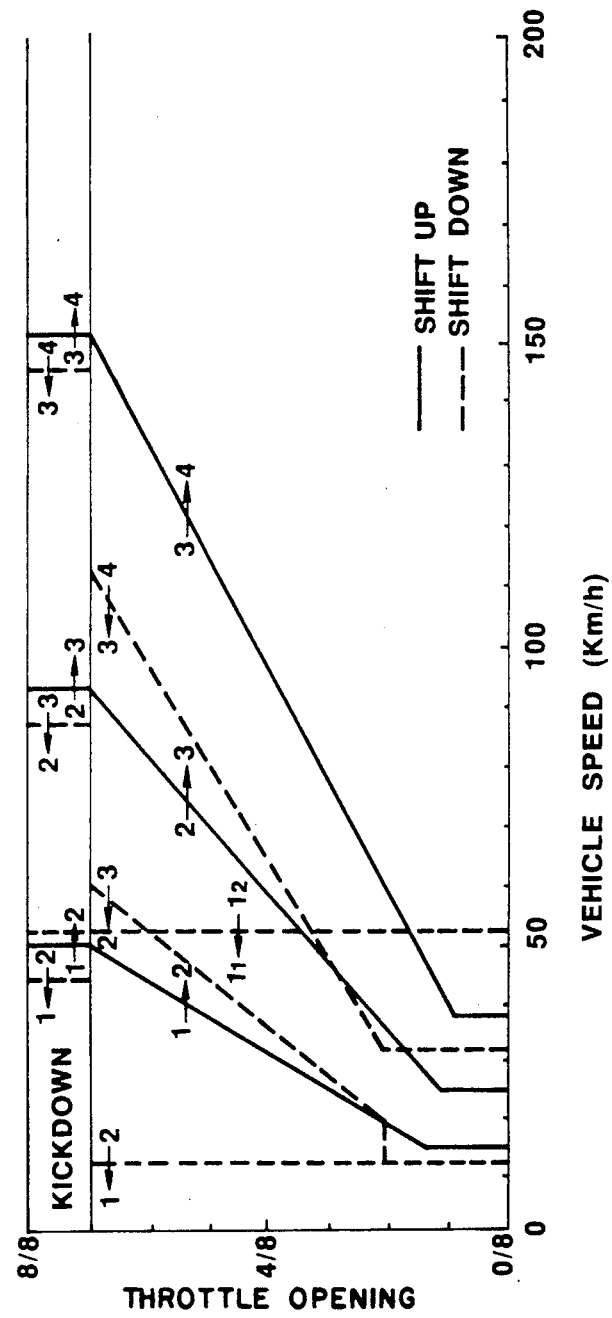

FIG.10

| GEAR RATIO / FRICTION ELEMENT | R/C | H/C | F/C | B/B | L&R/B |
|---|---|---|---|---|---|
| REVERSE | ○ | | | | ○ |
| FORWARD 1ST | | | ○ | | |
| FORWARD 2ND | | | ○ | ○ | |
| FORWARD 3RD | | ○ | ○ | | |
| FORWARD 4TH | | ○ | ○ | ○ | |

FIG.11

| GEAR RATIO / SOL. | SOLENOID 1 | SOLENOID 2 |
|---|---|---|
| 1ST | ON | ON |
| 2ND | OFF | ON |
| 3RD | OFF | OFF |
| 4TH | ON | OFF |

LINE PRESSURE CONTROL ARRANGEMENT FOR AUTOMOTIVE AUTOMATIC TRANSMISSION

BACKGROUND OF THE INVENTION

1. Field of the Invention

The present invention relates generally to an automatic automotive transmission and more specifically to a control system for such a transmission which features tri-stage shift shock attenuating line pressure control during shifting operations.

2. Description of the Prior Art

In automotive transmissions it is conventional when a transmission upshifts (for example), for the friction element or elements which are involved in producing the speed from which the shift is being made, to be released before the one or ones which produce the speed to which the shift is being made, are engaged. During the engagement of the latter mentioned elements the level of the line pressure is controlled solely with respect to the load on the engine (viz., the position of the accelerator pedal or throttle valve).

However, this results in the drawback that, as shown in FIG. 9, during the initial and final stages of the friction element engagement relatively large shift shock inducing fluctuations in the torque transmission (see spikes indicated by P and Q), occur.

In order to obviate this problem the arrangement disclosed in JP.A.60 231059 was proposed. With this arrangement the level of the line pressure is controlled to a single essentially constant level from the time the shift actually begins to take place until the time it actually finishes. However, even with this control the spikes P and Q and the resulting shift shock are not satisfactorily suppressed.

SUMMARY OF THE INVENTION

It is an object of the present invention to provide a line pressure control arrangement via which shift shock, especially during upshifting, can be attenuated to an acceptable level.

In brief, this above object is achieved by a tri-stage control arrangement wherein upon a shift command being issued the line pressure is dropped to a first low level until such time as the inertia phase of the shift begins. From this time the level of line pressure is raised and maintained at a second higher level until the end of the inertia phase. During the final stage of the shift, the level of line pressure is again lowered. In accordance with this control, the spike in the transmission torque output which tends to occur at the beginning of the inertia phase is attenuated by the first low line pressure level, the level of torque which is transmitted during the inertia phase is elevated by the second higher level and the spikes which tend to be produced by the final engagement are reduced by the temporarily lowered final stage line pressure level.

More specifically, a first aspect of the present invention is deemed to comprise an automotive drive train which features: a transmission having an input shaft, an output shaft and a friction element which is operatively arranged between the input shaft and the output shaft, the friction element having elements which are rotatable relative to one another when the friction element is released and which are synchronously rotatable when the friction element is engaged; means issuing a shift command; and line pressure control means for: reducing the level of line pressure to a first predetermined level from the time a shift command is issued to the time an inertia phase wherein the relatively rotatable elements of the friction element begin to engage, begins; raising the level of line pressure to a second level which is higher than the first predetermined level from the time the inertia phase begins until the time the ratio of the rotation of the input shaft to the rotation of the output shaft reaches a predetermined value; and lowering the level of line pressure to a third level which is lower than the second level from the time the ratio of the rotation of the input shaft to the rotation of the output shaft reaches the predetermined value to the time the shift command ceases to be issued.

A second aspect of the invention is deemed to comprise a transmission which features: an input shaft; an output shaft; a friction element operatively arranged between the input shaft and the output shaft, the friction element having elements which are rotatable relative to one another when the friction element is in a released state and which are synchronously rotatable when the friction element is in a fully engaged state; means for producing a shift command; line pressure control means for: reducing the level of line pressure to a first predetermined level from the time a shift command is issued to the time the relatively rotatable elements of the friction element begin to engage; raising the level of line pressure to a second level which is higher than the first predetermined level from the time the relatively rotatable elements begin to engage to the time the ratio of the rotation of the input shaft to the rotation of the output shaft reaches a predetermined value, the predetermined value being a predetermined amount different from the ratio which is produced after completion of the shift; and lowering the level of line pressure to a third level which is lower than the second level from the time the ratio of the rotation of the input shaft to the rotation of the output shaft reaches a predetermined value to the completion of predetermined period of time which is time from the issuance of the shift command.

BRIEF DESCRIPTION OF THE DRAWINGS

FIG. 5 is a shift schedule according to which the control system shown in FIGS. 4A and 4B is induced to operate;

FIG. 10 is a table showing the relationship between the friction elements and the gear ratios produced in response to the selective engagement of said elements; and FIG. 11 is a table showing the manner in which the shift control solenoids of the transmission control system shown in FIGS. 4A and 4B, are energized in order to induce the selective shifting between the four forward gear ratios of the transmission gear train shown in FIG. 3.

DETAILED DESCRIPTION OF THE PREFERRED EMBODIMENTS

Figure 1:
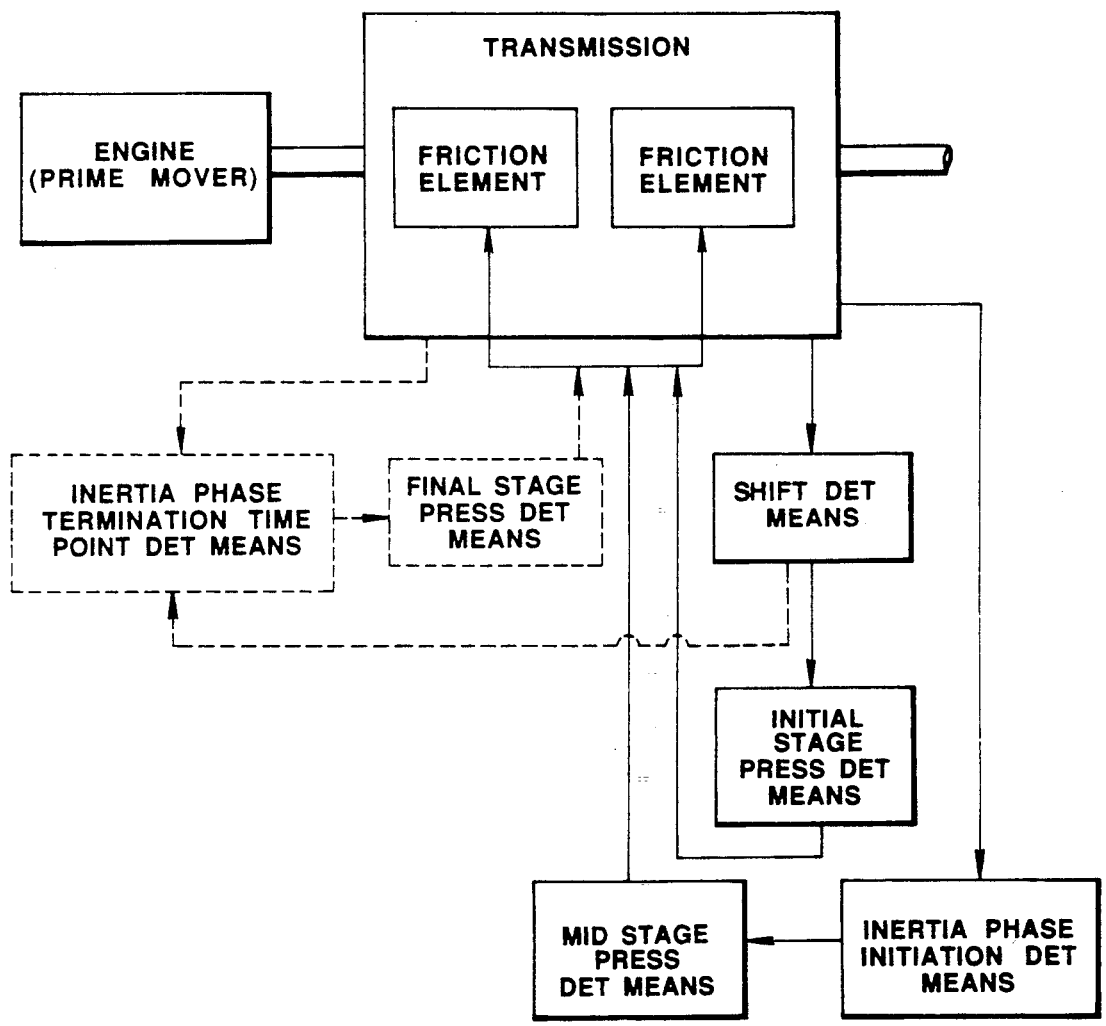
FIG. 1 is a schematic block diagram showing the conceptual arrangement of the present invention.
Figure 2:
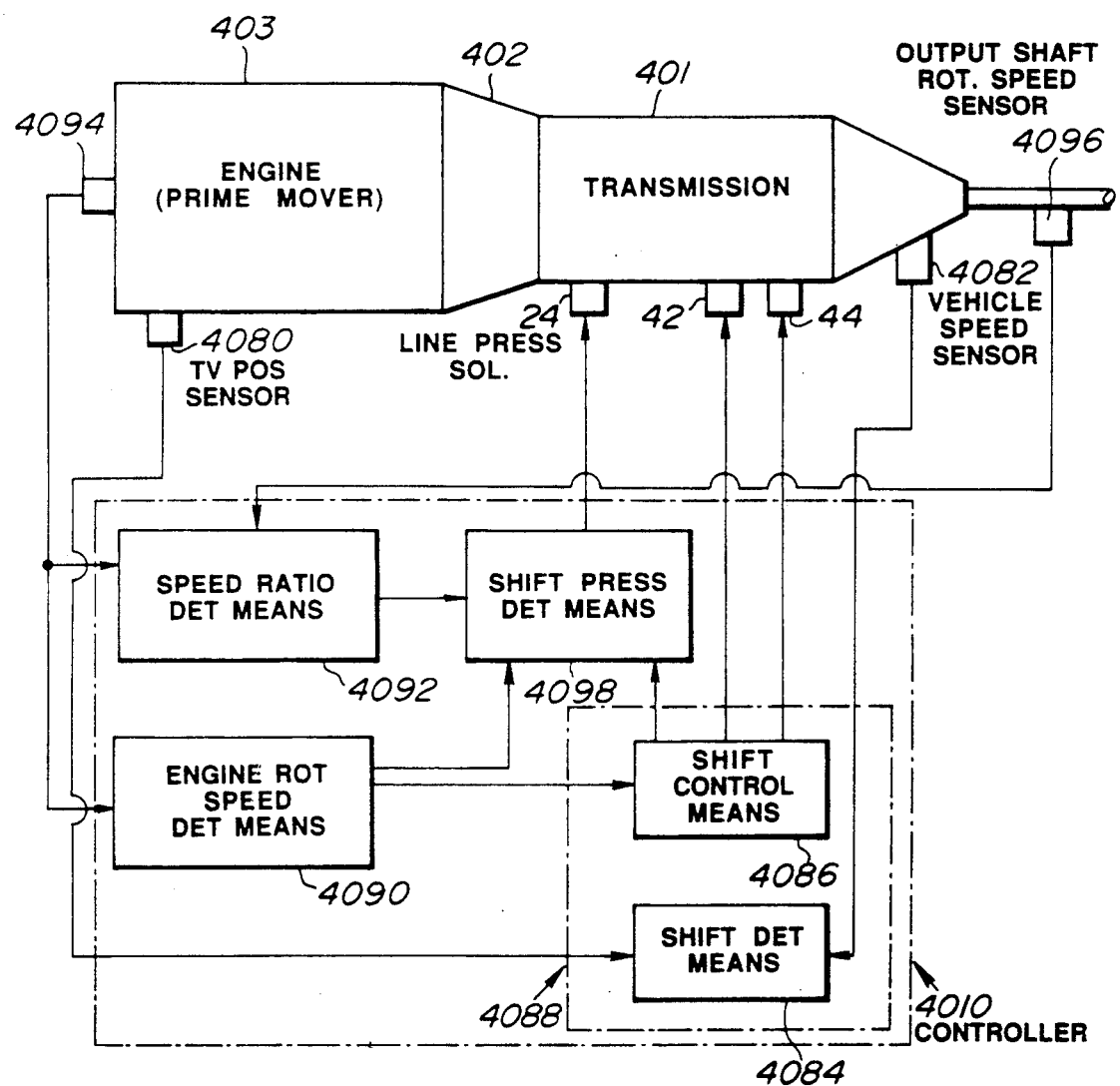
FIG. 2 is a schematic block diagram showing an engine system to which an embodiment of the present invention is applied.

FIG. 2 shows an engine/transmission power train to which an embodiment of the present invention is applied. This system includes an automatic transmission 401 which is operatively connected by way of torque converter 402 to prime mover (internal combustion engine) 403.

The transmission in this instance comprises first and second planetary gear units 412 and 414 which are arranged in tandem. As shown in FIG. 2, the forward planetary gear 412 comprises a front sun gear 412s, front pinion gears 412p, a front internal or ring gear 412i and a pinion gear carrier 412c. The rear planetary gear similarly comprises a front sun gear 414s, front pinion gears 414p, a front internal or ring gear 414i and a pinion gear carrier 414c.

In this arrangement a transmission input shaft 416 is arranged to be selectively connectable with the front sun gear 412s by way of a reverse clutch R/C, and selectively connectable with the front pinion gear carrier 12c by way of a H/C. The front planetary gear carrier 412c is selectively connectable with the rear ring gear 14i by way of a forward clutch F/C; the front sun gear 412s is connectable with the transmission housing through a band brake B/B, the front carrier 412c is selectively connectable with the transmission housing through a low and reverse brake L&R/B.

In addition to this, a forward overrunning clutch F/O is arranged between the forward clutch F/C and the rear ring gear 414i; while a low overrunning clutch L/O is arranged between front planetary gear carrier 412c and the transmission housing. An overrunning clutch O.R/C is to provide a selective connection between front planetary gear carrier 412c and the rear ring gear 414i and is arranged in parallel with the F/O.C.

By selectively supplying the above mentioned friction elements with line pressure in accordance with the table shown in FIG. 10, a plurality (4) forward speeds and one reverse gear ratio can be selectively produced. In this table, the circles denote the friction elements which are supplied with the above mentioned line pressure.

Figure 3:
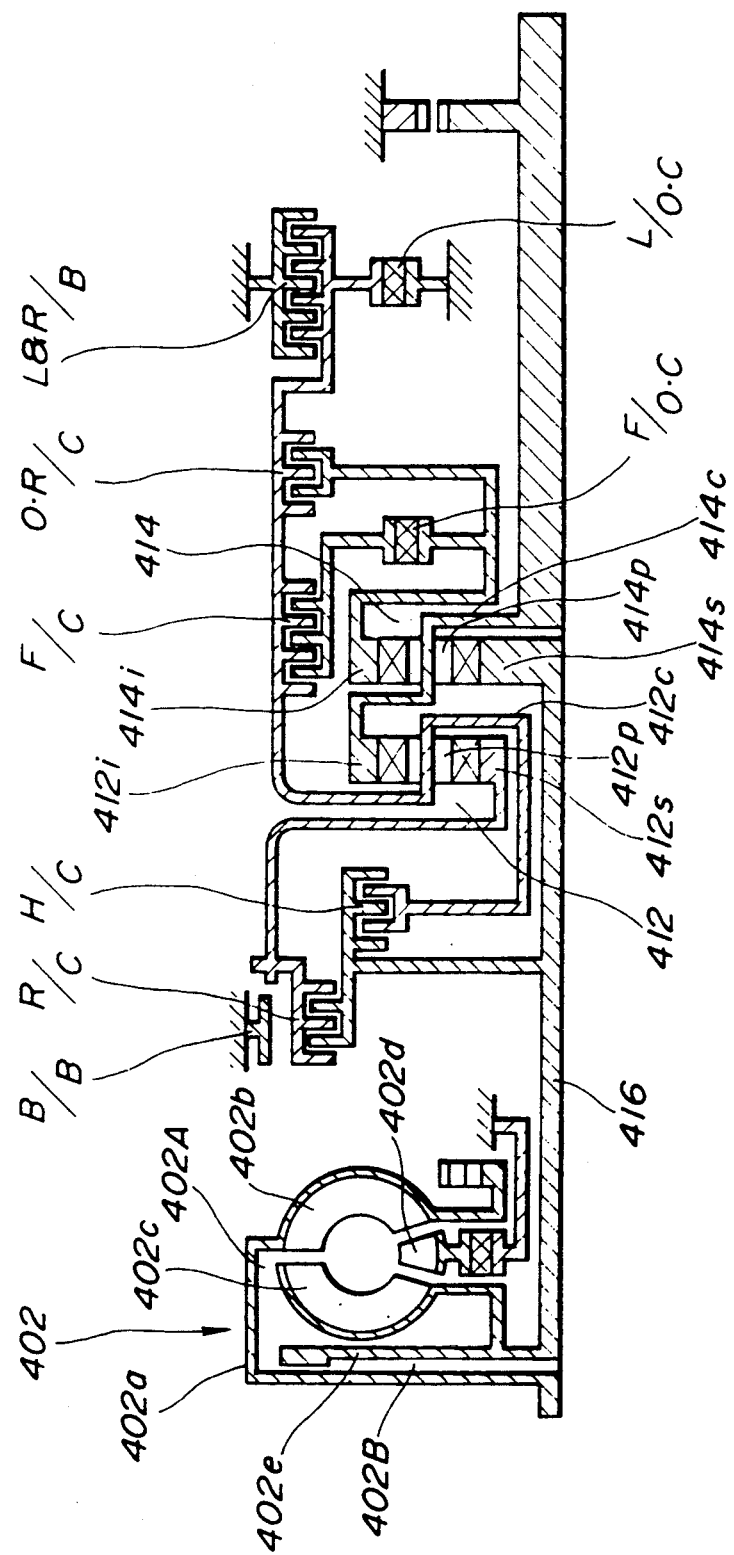
FIG. 3 is a schematic sectional elevation showing details of the transmission gear train illustrated in FIG. 2.

It should be also noted that with the gear train illustrated in FIG. 3 the forward overrunning clutch F/O.C is arranged such that when the front planetary gear 412c and the rear ring gear 414i are prevented from rotating in the opposite direction from one another.

It should also be noted that even though it is not shown in the table shown in FIG. 10, when the above mentioned overrunning clutch O.R/C is engaged, the function of the forward overrunning clutch is negated and engine braking is rendered possible.

Figure 4A:
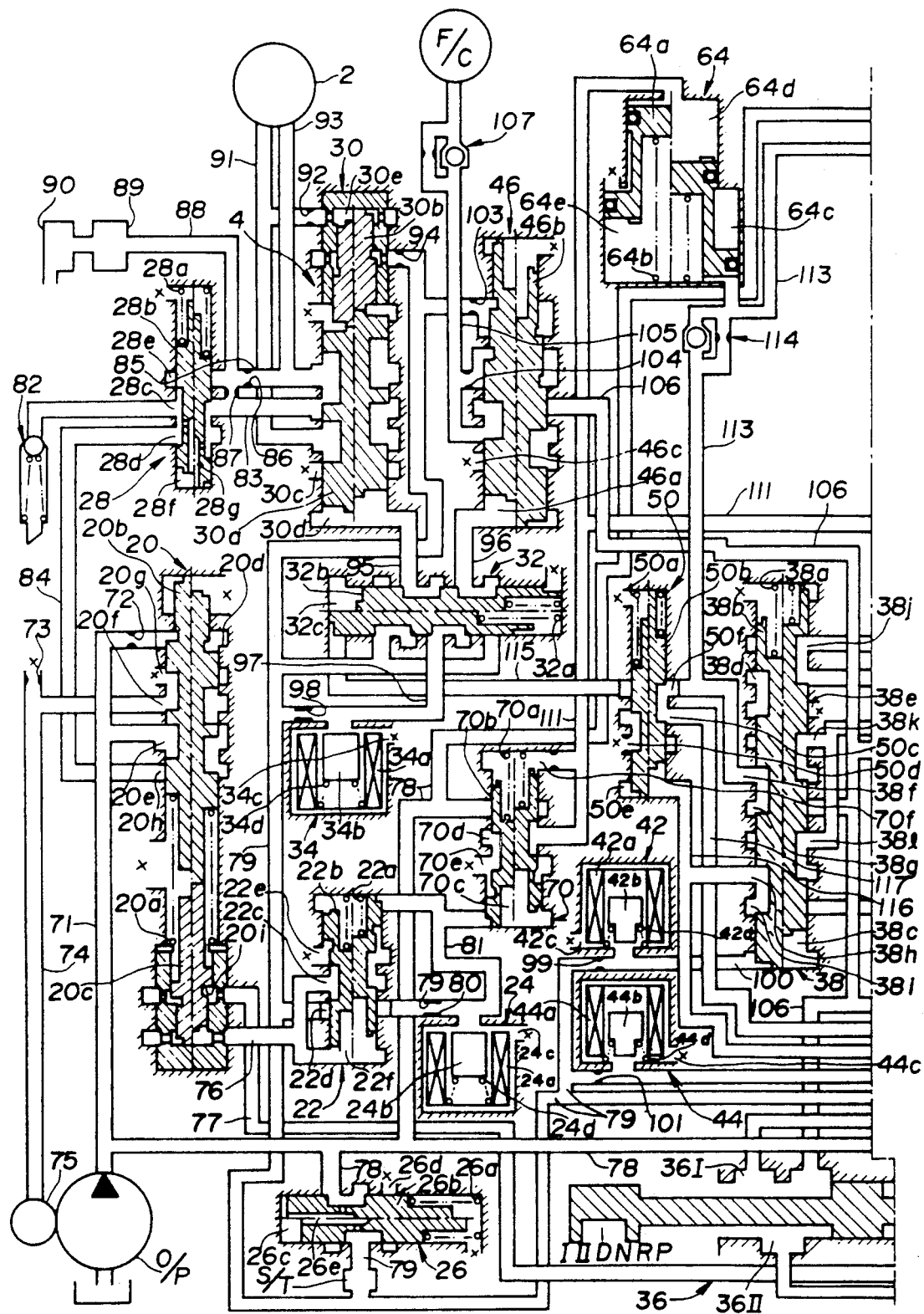
FIG. 4A and 4B show a hydraulic control system which is used to control the gear train shown in FIG. 3.
Figure 4B:
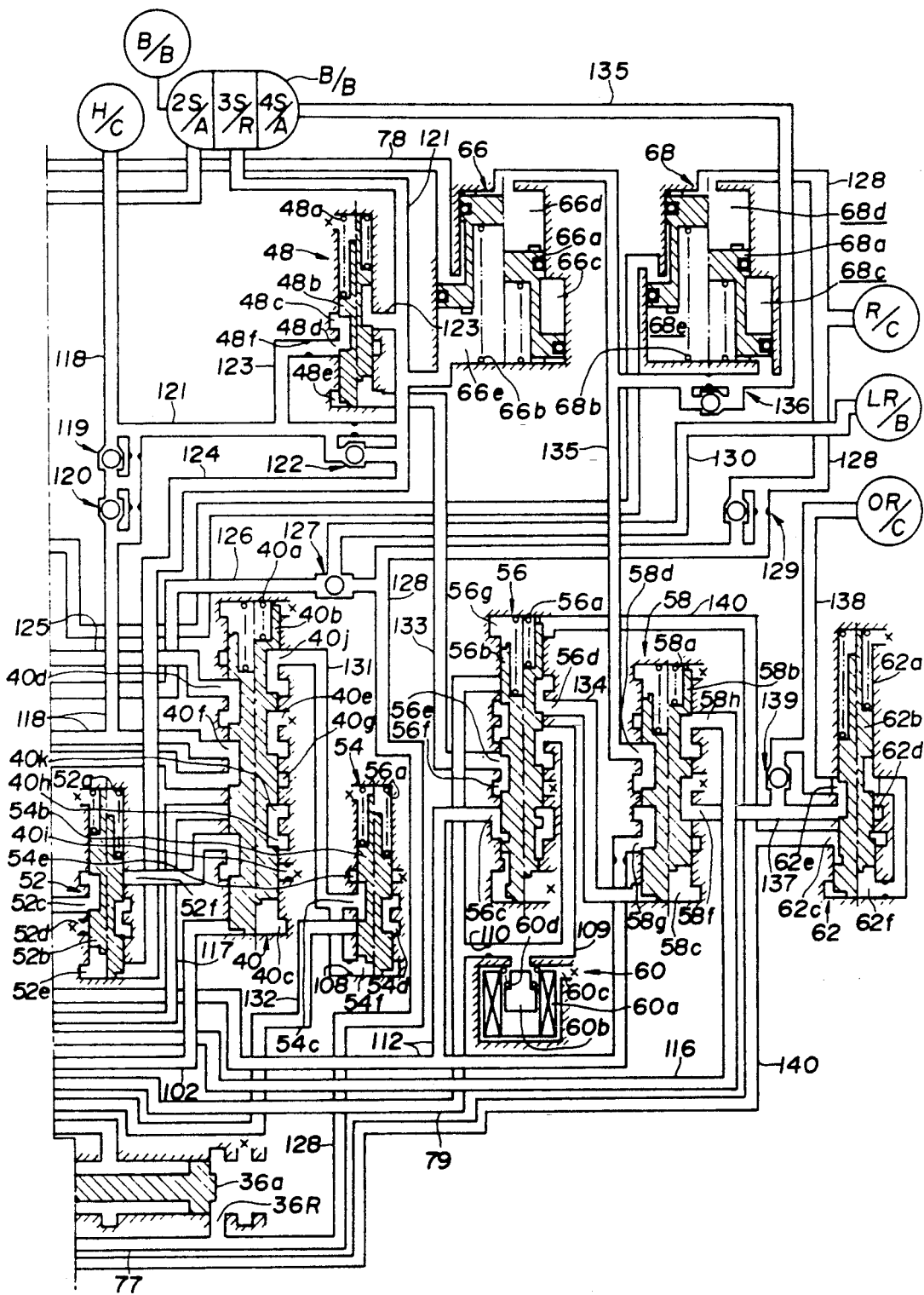

FIGS. 4A and 4B show a hydraulic control circuit by which the above mentioned friction elements are selectively engaged and disengaged. This circuit includes a pressure regulator valve 20, a pressure modifier valve 22, a line pressure solenoid 24, a pilot valve 26, a torque converter regulator valve 28, a lock-up control valve 30, a shuttle valve 32, a lock-up solenoid 34, a manual valve 36, a first shift valve 38, a second shift valve 40, a first shift solenoid 42, a second shift solenoid 44, a forward clutch control valve 46, a 3.2 timing valve 48, a 4.2 relay valve 50, a 4.2 sequence valve 52, a first range pressure reducing valve 54, a shuttle valve 56, a overrunning clutch control valve 58, a third shift solenoid 60, an overrunning clutch pressure reducing valve 62, a second speed servo apply pressure accumulator 64, a third speed release pressure accumulator 66, a fourth speed servo apply pressure accumulator 68 and an accumulator control valve 70.

The above listed elements cooperate in a manner to control the supply of line pressure hydraulic fluid from the pressure modulator valve 22 to the reverse clutch R/C, high clutch H/C, the forward clutch F/C, band brake B/B, low and reverse brake L&R/B, the overrunning clutch O.R/C in response to the shifting of the first and second shift valves 38, 40.

It should be noted that the above described arrangement is disclosed in U.S. Pat. No. 4,730,521 which issued on Mar. 15, 1988 in the name of Hayasaki et al. The contents of this document is hereby incorporated by reference thereto.

It should be further noted that band brake servo BS which operates the band brake B/B, includes a second speed servo apply chamber 2S/A, a third speed servo release chamber 3S/R and a fourth speed apply chamber 4S/A. When the second speed apply chamber 2S/R is supplied with line pressure the band brake is applied. However, when the third speed release chamber 3S/R is supplied with line pressure, even though the second speed apply chamber continues to be supplied with pressure, the band brake is released. Further, when the fourth speed apply chamber is pressurized, irrespective of the supply of pressure into the other two chambers (viz., 2S/A and 3S/R), the band brake is applied.

The shifting of the first and second shift valves 38, 40 is controlled by the first and second shift solenoids 42, 44, respectively. When these solenoids are energized, pilot pressure is supplied to the shift valves and the spool valve elements thereof assume the positions indicated by the right-hand half sections. On the other hand, when the solenoids are de-energized, the chambers into the pilot pressure is supplied, are drained and the spool valve elements assume the positions indicated by the left-hand half sections.

FIG. 11 shows in table form the relationship between the gear ratio which is produced and the ON/OFF energization statuses of the first and second shift solenoids 42, 44.

A control unit 4010 (see FIG. 2) is arranged to output control signals to first and second shift solenoids 42, 44 so as to control the operation of the first and second shift valves 38, 40 in accordance with a shift schedule of the nature shown in FIG. 5. As will be noted, this schedule is defined in terms of throttle opening (engine load) and vehicle speed. Shifting between gear ratios is controlled in accordance with the change in position of a throttle position/vehicle speed coordinate. The change in position can be induced by a change in one of or both of the above mentioned parameters.

The oil pump O/P is driven by the engine and the output is regulated by the pressure regulator valve 20 to form the above mentioned line pressure. As shown in FIG. 3A the pressure regulator valve 20 includes a bore in which upper and lower spool valve elements are reciprocatively disposed. The lower spool valve element is reciprocatively disposed in a plug which is fixed in the lower end of the bore. The bore is formed with a port 20d in which the output of the pump O/P is supplied. The pressure admitted into the valve bore through this port, acts on a pressure differential area in a manner to produce a bias which tends to move the upper spool downwardly (as seen in the drawings). On the other hand, a spring 20a is disposed between a plug 20c and the upper spool and arranged to produce a bias which tends to move the spool in question upwardly.

The modifier pressure which is produced by the pressure modifier valve 22 is selectively supplied to the pressure regulator valve 20 under the control of the line pressure solenoid 24. In this case the modifier pressure is supplied via conduit 76 to a chamber defined in the pressure regulator valve 20 between the plug 20c and the bottom of a second or lower spool. This pressure produces an upward bias which tends to move the lower spool up into engagement with the upper one. The resulting movement of the upper spool modulates the pump output and controls the pressure appearing at port 20e to line pressure level.

The line pressure solenoid 24 is of the ON/DRAIN type and arranged to modulate the level of pilot pressure which is used to control the pressure modifier valve 24. By varying the duty ratio of the signal which is applied to the line pressure solenoid 24 it is possible to control the level of the pressure which is supplied to the pressure regulator valve via conduit 76, and therefore control the level of the line pressure. For example, by controlling the duty ratio to 0 (zero) the level of the modifier pressure which is supplied into conduit 76 can be reduced to a minimum. Under these conditions, the level of the line pressure is controlled to a minimum level under the influence of the spring 20a. It should be noted however, that under normal circumstance the level of the duty ratio signal is higher than 0.

As schematically indicated in FIG. 2, the control unit 4010 is arranged to output a control signal to the line pressure solenoid 24. During normal non-shifting modes of operation, the duty ratio of the signal is controlled in accordance with the opening degree of the engine throttle valve as sensed by a throttle sensor 4080.

The control circuit 4010 is arranged to receive data inputs from a vehicle speed sensor 4082, engine crankshaft angular displacement sensor 4094 and an output shaft rotational speed sensor 4096 in addition to the engine load indicative signal from the throttle valve position sensor 4080.

In accordance with a shift schedule of the nature depicted in FIG. 5, a shift determining arrangement which is schematically illustrated as black box 4084 in FIG. 2, determines the need for a shift and the particular shift which is required (e.g. 1-2 upshift, 3-2 downshift, etc.,). This decision is based on the engine load and vehicle speed data input from sensors 4094 and 4082. Data indicative of this decision is transferred to a shift control arrangement (depicted as shift control means 4086) which in turn generates ON/OFF control signals which are output to the shift control solenoids 42, 44.

In FIG. 2 the shift control means and the shift determining means are shown grouped into a section 4088 which will be referred to, for the purpose of explaining the present invention, as an upshift detection means. It should be noted that the illustration of the various functional stages of the present invention as separate black boxes has been made simply to facilitate the ease with which the concept of the instant invention can be comprehended. As will be readily understood, the various means which are depicted as forming part of the controller 4010 are in fact purely functional and are in fact included in soft/hard arrangements of one or more microprocessors and the like type circuitry.

The output of the angular displacement sensor 4094 is supplied to an engine rotational speed determining means 4090. In this instance this section is arranged to determine the engine speed from the pulse train signal output by the sensor 4094 and detect the beginning of the inertia phase. In this instance the amount of change in engine speed ($\Delta Ne$) per unit time $\Delta T$ (in this case the time between runs of a control routine which will be described in detail later) is used to determine the change ratio $\eta$ (viz., $\eta = \Delta\Delta Ne/\Delta T$). The point in time at which the value of $\eta$ changes from positive to negative can be used to determine the beginning of the inertia phase.

Figure 6:
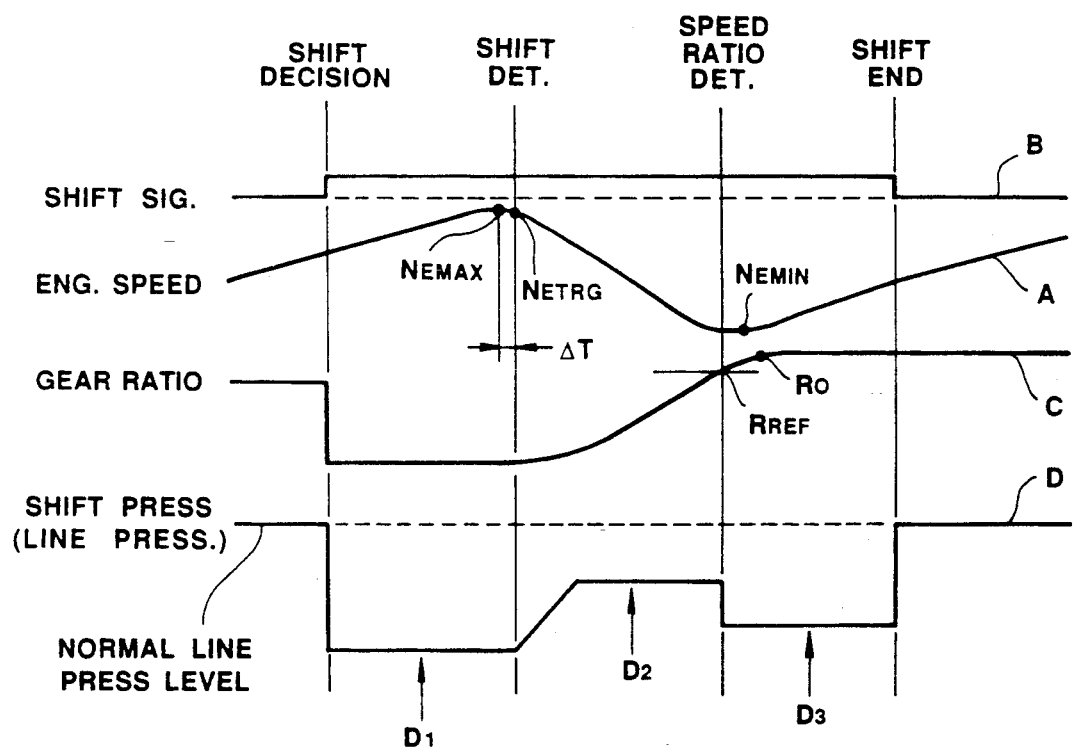
FIG. 6 is a timing chart showing the relationship which is produced between the shift signal, the engine speed, the transmission gear ratio, and the line pressure which is supplied to the friction elements, in accordance with the operation of the embodiment of the instant invention.

That is to say, as shown in FIG. 6, in response to a issuance of a shift command signal assuming a high level as indicated by trace B, the level of the line pressure (trace D) is sharply lowered to what shall be referred to as a low initial shift stage pressure. This level is maintained until such time as the peak engine speed NeMAX is detected (viz., the inflection point about which the polarity of the engine speed change per unit time changes from positive to negative).

In response to this detection the engine rotational speed determining means 4090 sets the beginning of the inertia phase at a time $\Delta T$ following the occurrence of NeMAX. Even though setting of the time at which the inertia phase is deemed to begin is actually slightly delayed in this instance, the effect on the mid shift stage pressure control is negligible.

When the change in engine speed reverts from negative to positive, viz., the engine speed reaches a minimum value Ne$_{MIN}$, the inertia phase finishes. It should be noted that in place of the engine speed parameter is possible to utilize the rotational speed of a torque converter turbine.

The above mentioned speed ratio determining means 4092 responds to the input data from the sensors 4094 and 4096 (note that the output of the vehicle speed sensor 4082 can be used in place of the output shaft rotational speed sensor 4096) and develops a ratio R in accordance with the following equation:

$$R = \frac{Ne}{i \times No} \quad (1)$$

wherein i denotes gear ratio produced after the upshift.

The speed ratio determining means 4092 is arranged to compare the R value with a gear ratio value RREF which is selected to occur prior a value Ro indicative of the actual end of the shift and use the timing whereat R=R$_{REF}$ as denoting the end of the inertia phase.

During the period defined between Ne$_{TRG}$ (the value which occurs $\Delta T$ after Ne$_{MAX}$) and R$_{REF}$, the signal which is output to the line pressure solenoid 24 is changed from that which is output during the initial shift stage and which induces the line pressure level denoted by D1. In accordance with this change in the line pressure solenoid control, during the mid shift stage line pressure characteristics denoted by D2 are produced.

After the detection of the value R having reached the RREF value, the final shift stage is entered. During this stage the reduced line pressure characteristics denoted by D3 are produced. This final stage terminates with the cessation of the shift command signal and the line pressure is sharply returned to the level normal for the instant set of non-shift operating conditions.

It will be noted at this time that the line pressure characteristics are not limited to those illustrated and may be modified taking the total vehicle chassis torque vibration characteristics into account.

Figure 7:
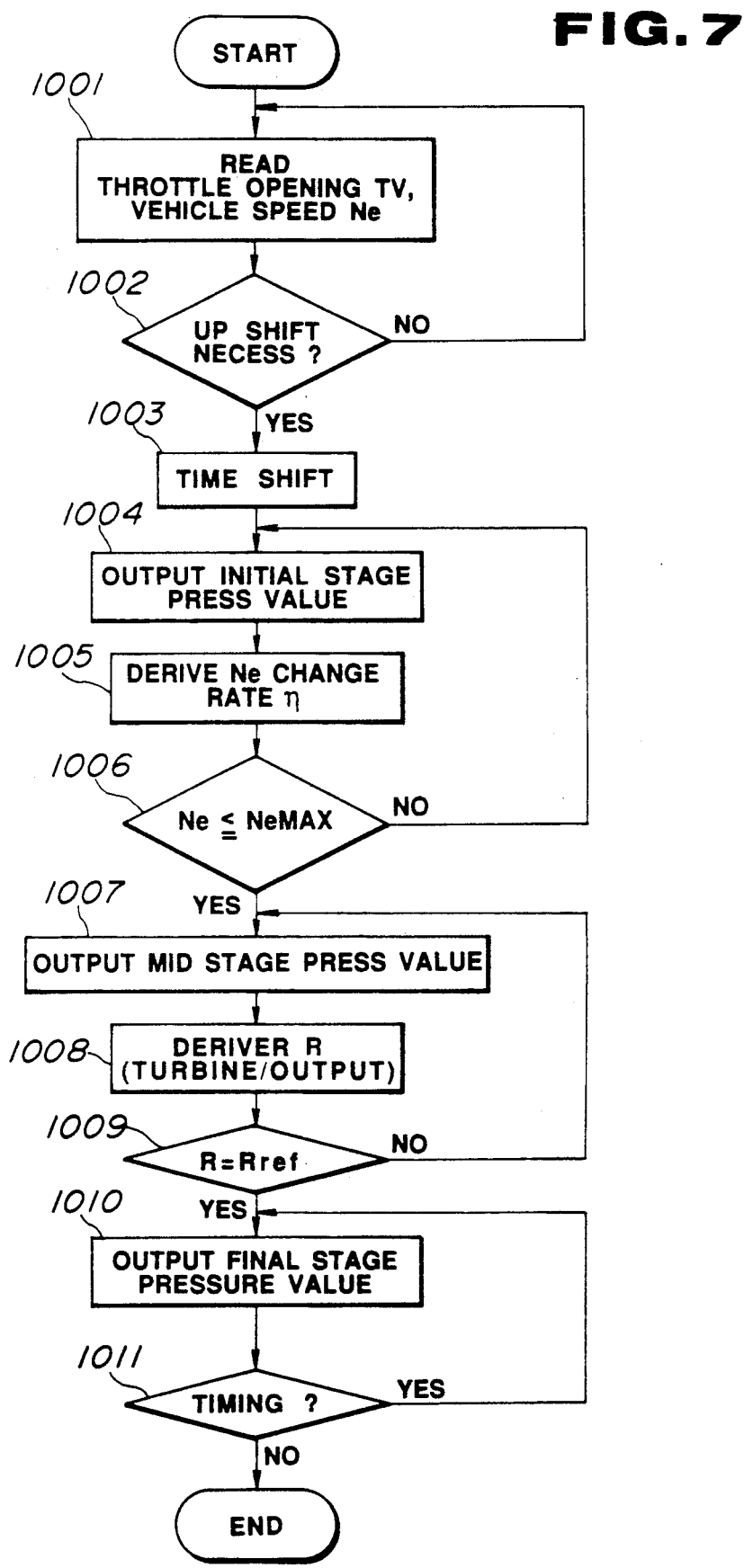
FIG. 7 is a flow chart depicting the steps which characterize the control implemented in accordance with the embodiment of the present invention.

FIG. 7 shows in flow chart form the steps which characterize the operation of the present invention. The routine which is depicted in this chart is arranged to be run a predetermined time intervals (e.g. $\Delta T$ which can be set at 10 msec by way of example only).

The first step 1001 of this routine is such as to read the inputs from the throttle position sensor 4080 and the vehicle speed sensor 4082. At step 1002 the instant engine load and vehicle speed values are used in connection with tabled data of the nature depicted in the shift schedule of FIG. 5 to determine if an upshift is required or not. In the event that no shift is indicated as being necessary, the routine recycles to step 1001. However, in the event of an affirmative indication the routine goes to step 1003 wherein a shift timer which times the period for which the shift command signal (trace B in FIG. 6) is generated and which can be either a hard or a soft arrangement, is set counting. Following this, the routine goes to step 1004 wherein the duty ratio required to induce the line pressure solenoid 24 to produce the D1 line pressure level is calculated and a command to issue a signal having the derived duty ratio is generated.

Following this, at step 1005 the output of sensor 4094 is sampled, the rate at which the value of Ne is changing is monitored and $\eta$ is derived. At step 1007 the value of Ne is compared with $Ne_{MAX}$. Until the engine speed is detected as having fallen to the minimum value, the routine is induced to recycle back to step 1005. However, upon the rate of change of the engine speed undergoing an inflection from positive to negative, the routine proceeds from the initial-stage loop to a mid-stage loop defined by steps 1007 to 1010. At step 1007 a subroutine generates a duty ratio suited to the production of the D2 line pressure. As will be appreciated, by appropriately setting the duty ratio the rate at which the pressure builds to a maximum can be influenced. At step 1008 the engine or torque converter turbine rotational speed and the output shaft (or vehicle speed) are compared and the ratio R developed with a predetermined $R_{REF}$ value. Until $R = R_{REF}$ the routine cycles back from step 1009 to step 1007 and repeats the mid stage loop.

Upon the value of R reaching RREF the routine is directed to step 1010 wherein a command which induces the duty ratio which induces the D3 line pressure characteristics is issued. These characteristics are maintained until such time as the timer has finished its count whereafter the line pressure is sharply returned to its normal level and subject to control in accordance with the throttle valve opening degree.

It is within the scope of the present invention to record duty ratio values for the D1, D2 and D3 stages in the form of map data for each of the shifts which can take place. Simply by way of example, this data can be recorded in terms of engine load and vehicle speed and each of the cells which are located at the engine load/vehicle speed coordinates arranged to each contain a D1, D2 and D3 duty ratio value. Alternatively, it is possible to produce a table for each value for each shift.

As the various techniques which are available for such purposes and the various variation which are possible, further disclosure will be omitted for brevity.

By way of example, in the event that the transmission undergoes a 1-2 upshift, the control unit 4010 responds by changing the energization of the first and second shift solenoids 42, 44 in the manner indicated in FIG. 11 (viz., ON/ON is changed to an OFF/ON status). At the same time a duty ratio suitable for the initial shift stage is generated and a corresponding signal output to the line pressure solenoid 24.

As a result, line pressure which is fed to the forward clutch F/C which is engaged in all forward gears and which was engaged in order to produce first gear, reduces and slippage between the driving and driven elements is permitted to take place. This permits the engine speed to increase while the band brake B/B, which must be engaged in addition to the forward clutch F/C to produce second gear, is supplied with the D1 level line pressure. As this level of line pressure is insufficient to enable actual engagement of the two elements both elements are permitted to slip momentarily. As a result the torque output characteristics of the transmission fluctuate in the manner indicated in FIG. 8.

As will be noted from these torque output characteristics are such that when the inertia phase is entered and the D2 line pressure characteristics are generated, the spike in the torque output (indicated at P in FIG. 9) which is produced in accordance with the prior proposed arrangements, is notably attenuated. Further, during the mid shift stage the level of torque transmission of both friction elements is increased with the control provided with the present invention with the result the effect of the spike P is effectively negated.

Figure 9:
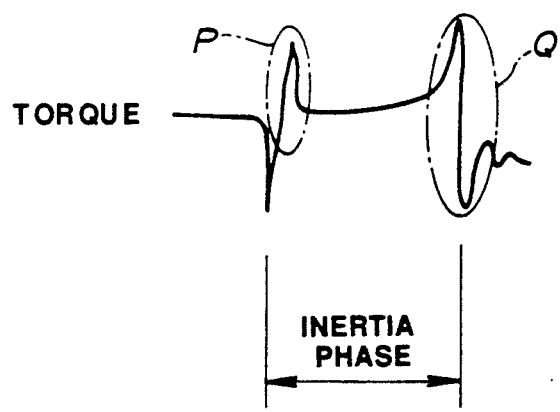
FIG. 9 is a chart similar to that shown in FIG. 8 showing the transmission torque output characteristics which produced with the prior proposed types of control technique.

Following the end of the inertia phase the reduction in line pressure to the D3 level attenuates the two consecutive spikes (the first positive and the second negative) indicated by Q in FIG. 9. The reason for this is that the torque transmission capacity of the two friction elements (viz., F/C and B/B) is reduced at the final engagement stage as a result of the momentary pressure reduction.

Figure 8:
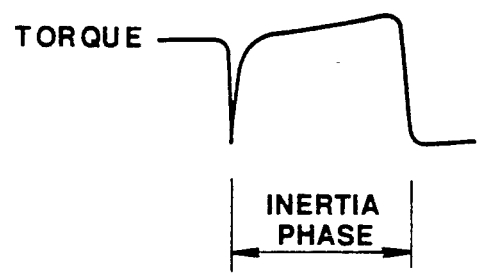
FIG. 8 is a chart showing the transmission torque output characteristics achieved with the embodiment of the invention.

Accordingly, with the instant embodiment during an upshift by raising and lower the level of the line pressure in the manner indicated in FIG. 6, it is possible to eliminate the three spikes in the transmission torque output (viz., P and Q in FIG. 9) and achieve the relatively smooth and improved characteristics shown in FIG. 8. This greatly attenuates shift shock and improves the shift feeling.

Of course the present invention is not limited to a 1-2 upshift and may be applied to other upshifts such as 2-3 and 3-4 shifts. Furthermore, it is also possible to apply the above technique to downshifts such a 4-3 shift.

What is claimed is:

1. In an automotive drive train
   a transmission having an input shaft, an output shaft and a friction element which is operatively arranged between the input shaft and said output shaft, the friction element having elements which are rotatable relative to one another when the friction element is released and which are synchronously rotatable when the friction element is engaged;

means issuing a shift command; and line pressure control means for:

reducing the level of line pressure to a first predetermined level from the time a shift command is issued to the time an inertia phase wherein the relatively rotatable elements of the friction element begin to engage, begins;

raising the level of line pressure to a second level which is higher than said first predetermined level from the time the inertia phase begins until the time the ratio of the rotation of the input shaft to the rotation of the output shaft reaches a predetermined value; and lowering the level of line pressure to a third level which is lower than said second level from the time the ratio of the rotation of the input shaft to the rotation of the output shaft reaches said predetermined value to the time the shift command ceases to be issued.

2. An automotive drive train as claimed in claim 1 wherein said transmission further comprises:

first and second shift control solenoids, said first and second shift control solenoids controlling a shifting of the transmission between four different forward speeds.

3. An automotive drive train as claimed in claim 2 further comprising:

a prime mover, said prime mover being operatively connected with said transmission;

a first sensor which senses a first parameter which varies with engine speed;

a second sensor for sensing a second parameter which varies with the load on an engine; and a third sensor for sensing a third parameter which varies with a rotational speed of said output shaft;

said shift command issuing means being responsive to a output of the second and third sensors, said line pressure control means being responsive to an output of the first and third sensors.

4. An automotive drive train as claimed in claim 2 further comprising:

second and third friction elements;

a hydraulic control circuit for selectively supplying line pressure to said first, second and third friction elements, said control circuit comprising:

first and second shift valves, said first and second shift valve being operatively connected with said first and second shift control solenoids, said first and second shift valve being conditionable to selectively supply line pressure to said first, second and third friction elements in a manner to condition said transmission to selective produce said four forward speeds.

5. In a transmission an input shaft;

an output shaft;

a friction element operatively arranged between said input shaft and said output shaft, said friction element having elements which are rotatable relative to one another when the friction element is in a released state and which are synchronously rotatable when the friction element is in a fully engaged state;

means for producing a shift command;

line pressure control means for:

reducing the level of line pressure to a first predetermined level from the time a shift command is issued to the time the relatively rotatable elements of the friction element begin to engage;

raising the level of line pressure to a second level which is higher than said first predetermined level from the time the relatively rotatable elements begin to engage to the time the ratio of the rotation of the input shaft to the rotation of the output shaft reaches a predetermined value, said predetermined value being a predetermined amount different from the ratio which is produced after completion of the shift; and lowering the level of line pressure to a third level which is lower than said second level from the time said ratio of the rotation of the input shaft to the rotation of the output shaft reaches a predetermined value to the completion of predetermined period of time which is time from the issuance of the shift command.

* * * * *

UNITED STATES PATENT AND TRADEMARK OFFICE
CERTIFICATE OF CORRECTION

PATENT NO. : 5,103,694
DATED : Apr. 14, 1992
INVENTOR(S) : Masayuki Kobayashi; Takashi Shibayama; Shigeru Ishii It is certified that error appears in the above-identified patent and that said Letters Patent is hereby corrected as shown below:

On title page, add item

[30]   Foreign Application Priority Data

Feb. 28, 1989 [JP]   Japan.............1-48758

Signed and Sealed this

Third Day of August, 1993

Attest:

MICHAEL K. KIRK

*Attesting Officer*     Acting Commissioner of Patents and Trademarks